(12) United States Patent
Xu et al.

(10) Patent No.: US 9,372,723 B2
(45) Date of Patent: Jun. 21, 2016

(54) SYSTEM AND METHOD FOR CONDITIONAL TASK SWITCHING DURING ORDERING SCOPE TRANSITIONS

(71) Applicants: Zheng Xu, Austin, TX (US); Tommi M. Jokinen, Austin, TX (US); William C. Moyer, Dripping Springs, TX (US)

(72) Inventors: Zheng Xu, Austin, TX (US); Tommi M. Jokinen, Austin, TX (US); William C. Moyer, Dripping Springs, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 111 days.

(21) Appl. No.: 14/231,784

(22) Filed: Apr. 1, 2014

(65) Prior Publication Data
US 2015/0277972 A1 Oct. 1, 2015

(51) Int. Cl.
*G06F 9/48* (2006.01)

(52) U.S. Cl.
CPC ............... *G06F 9/4843* (2013.01); *G06F 9/48* (2013.01)

(58) Field of Classification Search
None
See application file for complete search history.

(56) References Cited

U.S. PATENT DOCUMENTS

| | | | |
|---|---|---|---|
| 6,148,299 A * | 11/2000 | Yoshimoto | G06F 9/466 |
| 6,263,358 B1 * | 7/2001 | Lee | G06F 9/4881 718/100 |
| 6,430,594 B1 * | 8/2002 | Akiyama | G06F 9/461 718/102 |
| 6,470,376 B1 * | 10/2002 | Tanaka | G06F 9/30087 375/E7.093 |
| 6,721,309 B1 | 4/2004 | Stone et al. | |
| 7,594,234 B1 | 9/2009 | Dice | |
| 7,770,172 B2 | 8/2010 | Clift | |
| 7,895,431 B2 | 2/2011 | Bouchard et al. | |
| 8,015,567 B2 * | 9/2011 | Hass | H04L 49/15 370/258 |
| 8,189,591 B2 | 5/2012 | Blaker et al. | |
| 8,381,218 B2 * | 2/2013 | Periorellis | G06F 9/46 718/102 |
| 2002/0194328 A1 * | 12/2002 | Hallenbeck | G04G 13/021 709/224 |
| 2005/0055504 A1 * | 3/2005 | Hass | H04L 49/00 711/122 |
| 2006/0085793 A1 * | 4/2006 | McKenney | G06F 9/526 718/100 |
| 2008/0062927 A1 * | 3/2008 | Zhu | H04L 49/109 370/331 |

(Continued)

OTHER PUBLICATIONS

Non-Final Office Action mailed Sep. 3, 2015 for U.S. Appl. No. 14/231,789, 16 pages.

(Continued)

*Primary Examiner* — Matthew Brophy (57) ABSTRACT

A data processing system includes a processor core and ordering scope manager circuitry. The processor core sends an indication of a first ordering scope identifier for a current ordering scope a task currently being executed by the processor core and a second ordering scope identifier for a next-in-order ordering scope of the task. The ordering scope manager receives the indication the first and second ordering scope identifiers from processor core, and, provides a no task switch indicator to the processor core in response to determining that the first task is a first-in-transition-order task for the first ordering scope identifier and that processor core is authorized to execute the next-in-order ordering scope. The processor core transitions from executing in the current ordering scope to executing in the next-in-order ordering scope without performing task switch in response to the no task switch indicator being provided.

20 Claims, 4 Drawing Sheets

(56) References Cited

U.S. PATENT DOCUMENTS

| | | | | |
|---|---|---|---|---|
| 2009/0172675 A1* | 7/2009 | Grossman | ................. | G06F 9/52 718/101 |
| 2010/0262976 A1* | 10/2010 | Maruyama | .............. | G06F 9/462 718/108 |
| 2010/0287360 A1* | 11/2010 | Maruyama | ................. | G06F 9/52 712/225 |
| 2011/0083000 A1* | 4/2011 | Rhoades | ................... | G06F 1/10 712/22 |
| 2011/0093660 A1* | 4/2011 | Pelley, III | ............... | G06F 15/16 711/141 |
| 2012/0008631 A1* | 1/2012 | Hass | ....................... | H04L 49/00 370/394 |
| 2012/0137298 A1* | 5/2012 | Periorellis | ........ | G06Q 10/06313 718/102 |
| 2012/0272247 A1* | 10/2012 | Scott | ..................... | G06F 9/4881 718/108 |
| 2013/0128896 A1* | 5/2013 | Munoz | ............... | H04L 49/9078 370/412 |

OTHER PUBLICATIONS

U.S. Appl. No. 14/231,789, filed Apr. 1, 2014, entitled "System and Method for Conditional Switching During Ordering Scope Transistions".

U.S. Appl. No. 14/300,762, filed Jun. 10, 2014, entitled "System and Method for Conditional Task Switching During Ordering Scope Transitions".

* cited by examiner

SYSTEM AND METHOD FOR CONDITIONAL TASK SWITCHING DURING ORDERING SCOPE TRANSITIONS

CROSS-REFERENCE TO RELATED APPLICATION(S)

The present application is related to co-pending U.S. patent application Ser. No. 14/231,389, entitled "SYSTEM AND METHOD FOR CONDITIONAL TASK SWITCHING DURING ORDERING SCOPE TRANSITIONS" filed on Apr. 1, 2014, and co-pending U.S. patent application Ser. No. 14/300,362, entitled "SYSTEM AND METHOD FOR CONDITIONAL TASK SWITCHING DURING ORDERING SCOPE TRANSITIONS" filed on Jun. 10, 2014, the entirety of which are herein incorporated by reference.

FIELD OF THE DISCLOSURE

This disclosure generally relates to data processing, and more particularly to a system and method for task switching.

BACKGROUND

Multi-core processing systems often perform operations on packet data. The packet data is associated with a program identifier (program ID) that indicates a particular program to be executed by a core to process the packet data. A task manager or work scheduler can assign a particular core to execute the program to process the packet data. This combination of a program and corresponding packet data represents a specific task that is to be executed by the processing system, and in particular, once assigned to the core, this combination represents a specific task of the core. Each core can be assigned multiple tasks.

A task may be divided into one or more portions that are referred to as ordering scopes. When a task has multiple ordering scopes, each ordering scope generally represents an operation to be performed by the task without being interrupted by a task switch. For example, an ordering scope can correspond to a portion of the task's program code that is executed by the core between task switch instructions. An ordering scope can also correspond to an operation to be performed by a non-core resource. For example, an ordering scope can correspond to an operation for which control has been transferred from the core to the non-core resource, such as to a hardware accelerator, to execute on the packet data. Note that when an ordering scope is being executed by a non-core resource, the core assigned to process the ordering scope does not need to be actively processing that ordering scope. In such case, the core can be used to execute another ordering scope of the task, or to execute another task. When the ordering scope associated with the non-core resource is finished executing on the packet data, the core can resume executing on the original ordering scope, or on a next ordering scope.

A processor core can switch between tasks on ordering scope boundaries, e.g., after completion of one ordering scope and before starting a next ordering scope. However, the processor core needs to be able to store context information, e.g., state information, for a current task of a core before it exits the current task. The process of saving a particular core's context information for an executing task, and loading stored context information associated with a next task to be processed by the core, is generally referred to as context/task switching. Task switching provides a benefit of enabling a processor core to execute multiple tasks in a time-sliced manner. One cost of task switching is that there is some delay in switching between tasks due to the saving of current context information and the loading of stored context information for the next task. This cost is especially high in systems where a full context switch occurs for each context switch instruction, e.g., at every ordering scope boundary, without regard as to the next task.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A data processing system is disclosed that has a work scheduler, an ordering scope manager, and multiple processor cores. For each received data packet, the work scheduler of the processor determines a program identifier (program ID) of a program that is to process the packet data, and an ordering scope identifier that identifies the initial ordering scope of that program, which also corresponds to the start of the program. The work scheduler further assigns a unique task identifier (task ID) that corresponds to a received data packet and to the program that is to process the data payload of the data packet (the packet data). Thus, the task ID identifies a task that executes a particular instantiation of a program to process on a particular packet. Typically, tasks associated with different packets of the same data stream will have the same ordering scopes by virtue of executing different instantiations of the same program to process each respective packet of the data stream. The work scheduler further assigns each task to a processor core for processing by providing the task's identifier and its initial ordering scope identifier to one of the plurality of cores. According to an embodiment, an ordering scope table is maintained by an ordering scope manager of the processor, where each entry of the ordering scope table corresponds to a specific task. For example, a processor that can handle up to 256 tasks across all of its processor cores will have an ordering scope table with 256 entries.

Once a task is assigned to a processor core, the core receives permission from the ordering scope manager before beginning execution of the task. Even if the processor core has only one assigned task, it will wait to execute the assigned task until it receives permission to do so from the ordering scope manager. The ordering scope manager can determine if a newly assigned task can be executed based on information stored at the ordering scope table. According to an embodiment, the ordering scope manager will determine that an initial ordering scope of a newly assigned task is not available, e.g., the newly assigned task cannot be executed in that ordering scope, if the initial ordering scope is blocked by another task. For example, the initial ordering scope of a task can be blocked when another task is executing the ordering scope in an exclusive mode, also referred to herein as exclusively executing in the ordering mode. If the ordering scope is available (not blocked), the ordering scope manager notifies the assigned processor core that it is enabled to begin executing the task, also referred to herein as enabling the task.

When the task is enabled, the processor core can begin executing instructions that are stored at an address associated with the current ordering scope identifier, which for a new task is the initial ordering scope. While the processor core is executing instructions in the current ordering scope, an ordering scope hint instruction, also referred herein to as an ordering scope transition hint, can be executed as part of the instruction stream in anticipation of completing task execution in the current ordering scope. Thus, the hint instruction can be executed before the task executes a task switch instruction indicating the core has completed executing in the current ordering scope. The ordering scope transition hint can result in information being provided to the ordering scope manager that indicates the executing task's current and next-in-order ordering scopes. Based on this information, the ordering scope manager can determine whether or not the processor core needs to save the core's context information at the end of the current ordering scope. For example, the ordering scope manager can receive the ordering scope transition hint and based upon the current and next-in-order ordering scope ID's can use information stored at an ordering scope table to determine whether the processor core can execute in the identified next-in-order ordering scope of the task immediately after completion of the current ordering scope of the task. If so, there is no need to store the core's context information upon completion of the current ordering scope because execution will continue in the next ordering scope of the same task, and an indicator can be provided to the processor core that indicates the next ordering scope transition can occur without saving context information as part of a task switch.

As used herein, the term data packet, or the term packet, is intended to mean either a data packet with a header and payload portion that is associated with a particular packetized data stream, the data of such a packet, or any other received datum of a stream of data that may not be associated with a specific header.

Various embodiments of the present disclosure will be better understood with reference to FIGS. 1-4.

Figure 1:
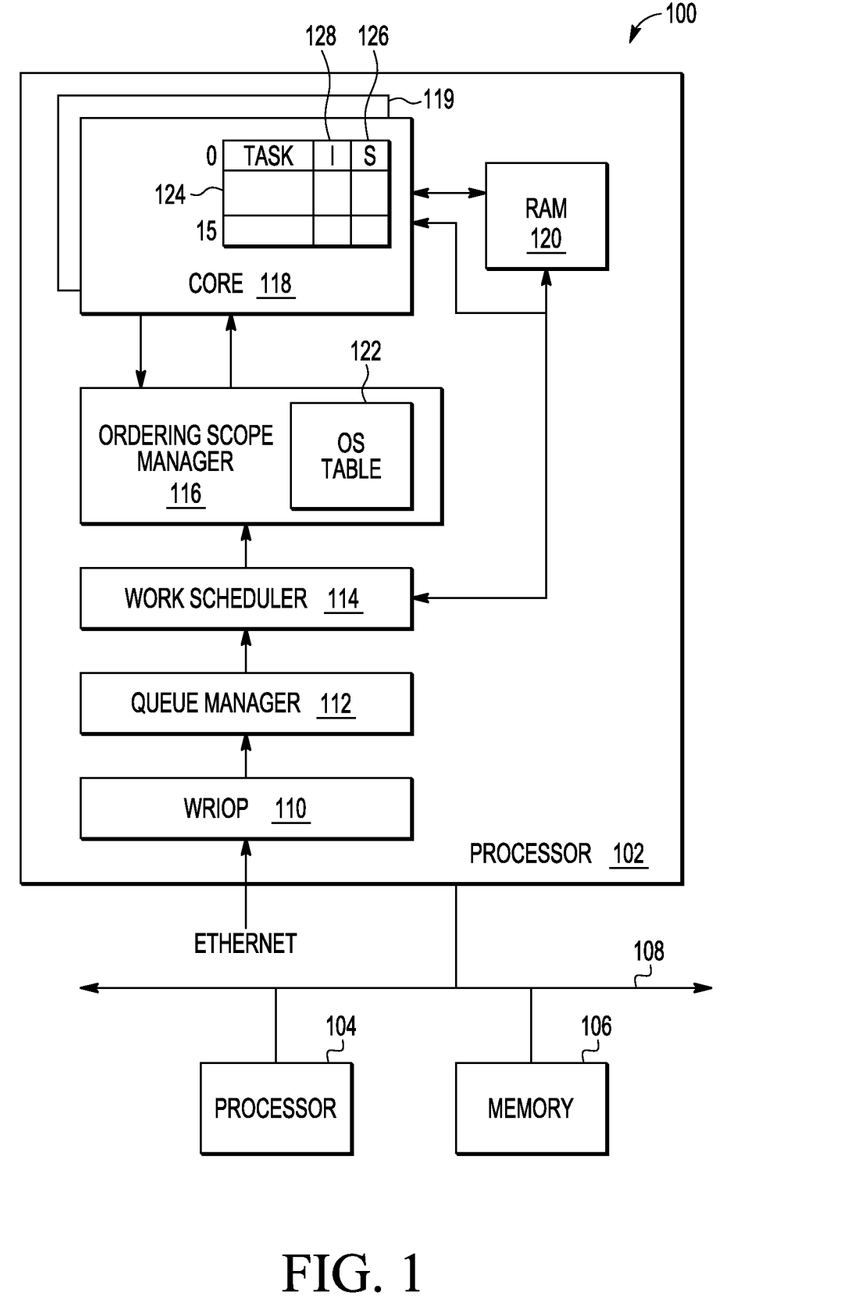
FIG. 1 illustrates a data processing system in accordance with at least one embodiment of the present disclosure.

FIG. 1 shows a circuit device, data processing system 100, in accordance with at least one embodiment of the present disclosure. The data processing system 100 includes various circuit portions including data processors 102 and 104, a memory 106, and a communication bus 108. The processor 102 includes an input/output module 110, such as Wire Rate Input/Output Processor (WRIOP), a queue manager 112, a work scheduler 114, an ordering scope manager 116, multiple processor cores, such as data processors 118 and 119 (also referred to herein as cores 118 and 119), and a random access memory (RAM) 120. The ordering scope manager 116 includes an ordering scope table 122. In an embodiment, the various features of processor 102, such as ordering scope manager 116, cores 118 and 119, can be general purpose or special purpose processors that can be state machines, instruction-based processors, other types of logic circuits capable of performing operations, or the like. By way of example, data cores 118 and 119 are presumed to be instruction-based processors. Each of the multiple cores of system 100 is presumed to be similar to core 118 as described herein, and, therefore, includes a task table 124 that includes information about its assigned tasks.

The processors 102 and 104 can communicate with each other and memory 106 via bus 108, and can store data to or receive data from the memory 106 via the bus 108. The processor 102 can also receive and send data packets, such as Ethernet data packets, from/to other devices via the input/output module 110, which may or may not be connected to the bus 108. The input/output module 110 classifies received Ethernet packets (data packets) and provides the packets to the queue manager 112, which in turn stores the data packet in a queue (not shown). During classification, the input/output module 110 can evaluate header information of a received data packet to determine a program to process the packet and to assign to the packet data a particular program ID identifying the program. Examples of various programs that can execute on a data packet include programs that perform decryption, de-compression, compression, and the like. The queue manager 112 can create/remove queues to store the data packets based on the number of packet streams received at the processor 102. Thus, upon classification, the data packet is assigned to an existing queue for that particular data stream, or a new queue is created to which the data packet is assigned.

After data packets are placed in a queue, the work scheduler 114 can assign tasks, on a packet-by-packet basis, by assigning each one of the data packets and a corresponding program to a corresponding task that in turn is assigned to a processor core. According to an embodiment, the work scheduler can provide task specific information to the ordering scope table 122 and to a task table 124 of one of the processor cores. An example of task information stored at ordering scope table 122 is illustrated at Table 1, below, which includes entries for current and pending tasks at a time T0. A column of Table 1 labeled "Task" lists identifiers (Task IDs) for tasks of the processing system, where each row is associated with a different task. It will be appreciated that because there is a one-for-one relationship between tasks and entries of the ordering scope table 122, that an actual Task ID need not actually be stored at the ordering scope table 122, as each entry can correspond to a an index value specific to a unique task, e.g., the first entry of table 122 can be understood to correspond to Task0. For convenience, only the active (valid) tasks are shown in the tables herein, e.g., only those entries that correspond to current or pending tasks are illustrated at Table 1.

TABLE 1

Ordering scope table (Time T0)

| Task | OS ID | Exclusive | Transition Position | Exclusive Position |
|---|---|---|---|---|
| Task0 | OS1 | 1 | 0 | 0 |
| Task1 | OS4 | 1 | 0 | 0 |
| Task2 | OS1 | 1 | 1 | 1 |
| Task3 | OS6 | 0 | 0 | X |
| Task4 | OS1 | 0 | 2 | X |

A column of Table 1 labeled "OS ID" indicates the active ordering scope of the task, e.g., either the ordering scope currently being executed or to be executed. The column of Table 1 labeled "Exclusive" indicates whether a corresponding task needs to operate in the current ordering scope in an exclusive mode. According to a specific embodiment, only one task can execute exclusively in a given ordering scope at a time. Conversely, any number of tasks can execute non-exclusively in a given ordering scope at a time. Thus, multiple tasks can non-exclusively execute in the same ordering scope—either by themselves or with one task exclusively executing in the same ordering scope. It will be appreciated that in other embodiments, different limitations can apply when an ordering scope is operating in exclusive mode.

In the specific embodiment of Table 1, OS1 is the active ordering scope for Task0, Task2, and Task4. However, while both Task0 and Task2 are to exclusively execute in OS1, as indicated by a one (1) in their Exclusive columns, Task4 is to non-exclusively execute in OS1, as indicated by a zero (0) in its Exclusive column, as will be described in greater detail below. Note that information as to whether a task is to exclusively execute in a particular ordering scope is defined by the task's program in a manner determinable by the ordering scope manager.

A column of Table 1 labeled "Transition Position" indicates a relative order that tasks are assigned a particular ordering scope. Thus, in Table 1, a value of zero (0) is stored at Task0, Task1, and Task3 to indicate they are first-in-order, relative to their respective ordering scopes, for transitioning out of (or completing) their current ordering scopes because the tasks were the first task assigned for their respective ordering scopes. However, in Table 1, Task2 has a Transition Position of "1" because another task, Task0, has already been assigned to the same ordering scope, and Task4 has a Transition Position of "2" because both Task0 and Task2 are already assigned to the same ordering scope as Task4. A column of Table 1 labeled "Exclusive Position" indicates a relative order that tasks to be exclusively executed are to be enabled for exclusive execution in the ordering scope. By way of example, the order is presumed to be the same sequence as the tasks were assigned to the ordering scope table. Thus, in Table 1, a value of zero (0) is stored in the Exclusive Position column of Task0 and Task1 to indicate they are first-in-order, relative to their respective ordering scopes, for exclusive execution, and a value of one (1) is stored at the Exclusive Position of Task2 to indicate it will exclusively execute in OS1 after Task0 completes execution in OS1.

The information at the different fields of each entry in the ordering scope table can be utilized to determine whether a task is currently executing in a particular ordering scope or is a pending task. In an embodiment, a task can be currently executing in an ordering scope unless a condition exists that prevents the task from starting or completing execution of an ordering scope. For example, in Table 1, Task2 is a pending task because Task2 is preventing from executing in OS1 based on the Exclusive bit for Task2 being set to "1" and the Exclusive Position also being set to "1", which indicates that another task in exclusively executing in OS1. In an embodiment, the Exclusive Position for a task that is to non-exclusively execute in its current ordering scope, e.g., Task3 and Task4, can be set to "X", which indicates that the task does not have a relative order for exclusive execution. In different embodiments, the ordering scope table may have different entries (more or less) than described herein, and the ordering scope manager can still utilize the ordering scope table in substantially the same manner.

In addition to updating the ordering scope table as packets are assigned to tasks, the work scheduler 114 also assigns the tasks to processor cores for execution. Information for each task assigned to processor core 118 by the work scheduler 114 can be stored in a corresponding entry of task table 124. For example, Table 2 illustrates the state of task table 124 of processor core 118 at time T0, wherein processor core 118 has been assigned tasks Task0, Task1, and Task2, as indicated by the task identifiers listed in the column labeled "Task".

TABLE 2

| Task Table 124 for Processor Core 118 (Time T0) | | | | |
|---|---|---|---|---|
| Task | Data Packet | Inhibit | Speculative/Yield | Ordering Scopes |
| Task0 | DP1 | 1 | 1 | OS1, OS2, OS3 |
| Task1 | DP2 | 1 | 1 | OS4, OS5 |
| Task2 | DP4 | 1 | 1 | OS1, OS2, OS3 |

The work scheduler 114 further stores task information at each core's task table 124 that identifies the packet data being processed by the corresponding task, wherein this information can be used to access the actual packet data. For example, the column of Table 2 labeled "Data Packet" indicates the packet data being processed by each assigned task. In operation, this information can be an address, or other information that can be used to determine the address where the packet data is stored. Thus, the packet data for packet DP1 is to be processed by Task0, the packet data for a packet DP2 is to be processed by Task1, and the packet data for a packet DP4 is to be processed by Task2.

The column of Table 2 labeled "Inhibit" indicates whether processor core 118 has been enabled to execute a task corresponding to the entry, wherein a value of one (1) indicates that the core is not allowed to execute the task in the indicated ordering scope, and a value of zero (0) indicates that the core can execute the corresponding task in the indicated ordering scope, e.g., the task has been enabled (released). The column of Table 2 labeled "Speculative/Yield" indicates whether the processor core needs to yield (wait) before completing the execution of a current ordering scope and starting the execution of a next ordering scope. All of the tasks, e.g., Task0, Task1, and Task2, assigned in Table 2 will yield/wait before completing the current ordering scope, as indicated by a one (1) in their Speculative/Yield columns. However, when the value of its Speculative/Yield column is set to zero (0), a task can complete the current ordering scope and begin execution of a next ordering scope without yielding, as will be described in greater detail below.

The work scheduler 114 also stores information at the task table that indicates the location of the program code corresponding to the task that is to be used by the processor core to process the packet data. By way of example, this information is represented at Table 2 in the column labeled "Ordering Scopes". It will be appreciated, that only information indicating the program code location of the current ordering scope needs to be included in the task table 124, but for convenience of discussion, all of the ordering scopes of each task are indicated. Thus, Task0 includes three ordering scopes: OS1, OS2, and OS3; Task1 includes two ordering scopes OS4 and OS5; and Task2 includes three ordering scopes: OS1, OS2, and OS3. Note, that the programs being executed by Task0 and Task2 execute different instantiations of the same program code, and therefore have the same ordering scopes.

As discussed above, the ordering scopes can be defined in the program code based upon an understanding of a programmer or compiler as to the resources needed by particular code portions when executed by a task. The ordering scopes of a task can be indicated in the task code through the use of ordering scope transition instructions that are located in the task software at an ordering scope boundary, such as the last instruction of an ordering scope. Execution of an ordering scope transition instruction results in a transition request to be sent to the ordering scope manager that indicates a next ordering scope to be executed, and whether the next ordering scope is to be exclusively executed. However, the processor continues to execute the task in the current ordering scope until explicit permission to transition from that ordering scope is received from the ordering scope manager.

Table 3 corresponds to the task table of a processor core other than processor core 118, presumed herein to be processor core 119. As illustrated, the second processor core has two tasks assigned thereto: Task3 of Table 3 is to execute program code that implements ordering scopes OS5, OS7, and OS8 to process packet data DP3; and Task4 that is to execute the same program code as Task0 and Task2 to process packet data DP5.

TABLE 3

Task Table for Processor Core 119 (Time T0)

| Task | Data Packet | Inhibit | Speculative/Yield | Ordering Scopes |
|---|---|---|---|---|
| Task3 | DP3 | 1 | 1 | OS6, OS7, OS8 |
| Task4 | DP5 | 1 | 1 | OS1, OS2, OS3 |

Work scheduler 114 can assign a task to a particular core based on the resources needed to perform the task, the availability of the each processor core, and the like. The work scheduler 114 can continue defining and assigning tasks until no more data packets remain unassigned in the processor 102 or until all of the task table's entries of the processor cores are full, e.g., all available tasks have been assigned. In an embodiment, each processor core can have up to sixteen tasks assigned—one to each entry of its task table, wherein the data processor 102 could have sixteen processor cores capable of supporting up to two hundred and fifty-six possible tasks—each one corresponding to an entry of the ordering scope table 122.

As described above, the work scheduler 114 can assign tasks to one or more processor cores. Note that the work scheduler 114, or other resource, can also retrieve the packet data from a queue, and store the packet data for each of the tasks in the RAM 120.

In an embodiment, the ordering scope manager 116 controls when tasks can execute in a given ordering scope by providing an enable/release signal to the processor core associated with that task. In an embodiment, the ordering scope manager 116 can begin enabling tasks as soon as a first data packet is assigned to a task, and the task is assigned to a processor core. Beginning at Table 4, which illustrates a state of ordering scope table 122, an embodiment of exemplary operation is described beginning at an initial time T0 that is different from the embodiment described previously with respect Tables 1-3, which also was described with reference to a different initial time referred to as T0.

At time T0, in response to an initial data packet DP1 being assigned to Task0, the state of the ordering scope table represented by Table 4 indicates, by virtue of its existence, that only Task0 has been created. The initial ordering scope of Task0 is OS1 as indicated by the OS ID of Task0, the Exclusive bit is set to "1", and the Transition Position and Exclusive Position bits are each set to "0". According to an embodiment, the ordering scope manager 116 can notify the processor core 118, to which Task0 is assigned, that it is authorized to start executing the task by: sending an enable signal to the processor core 118 to enable execution of Task0; by setting an indicator at a storage location that is monitored by the processor core 118; and the like.

TABLE 4

Ordering scope table (Time T0)

| Task | OS ID | Exclusive | Transition Position | Exclusive Position |
|---|---|---|---|---|
| Task0 | OS1 | 1 | 0 | 0 |

The Transition Position indicator of Task0 at Table 4 has been set to zero (0) by the ordering scope manager 116 by virtue of Task0 being the only task executing in OS1 at the time Task0 was made current, e.g., the time that Task0 was assigned to a specific processor core, which is presumed herein to be processor core 118. In response to Task0 having been enabled (released by the ordering scope manager 116) at time T0, the inhibit bit at the task table of core 118 has been set to zero (0), as shown in Table 5 below.

TABLE 5

Task Table 124 for Processor Core 118 (Time T0)

| Task | Data Packet | Inhibit | Speculative/Yield | Ordering Scopes |
|---|---|---|---|---|
| Task0 | DP1 | 0 | 1 | OS1, OS2, OS3 |

Therefore, in response to Task0 being enabled, processor core 118 can begin executing Task0 in ordering scope OS1, which can include retrieving the data DP1 and the instructions associated with the Task0.

While Task0 is executing in OS1, the work scheduler 114 can assign one or more other data packets to tasks, which will be indicated in the ordering scope table 122. For example, at time T1, as indicated at the ordering scope table illustrated at Table 6, the work scheduler 114 has defined four more tasks (Task1-Task4) in a similar manner as described previously.

TABLE 6

Ordering scope table (Time T1)

| Task | OS ID | Exclusive | Transition Position | Exclusive Position |
|---|---|---|---|---|
| Task0 | OS1 | 1 | 0 | 0 |
| Task1 | OS4 | 1 | 0 | 0 |
| Task2 | OS1 | 1 | 1 | 1 |
| Task3 | OS6 | 0 | 0 | X |
| Task4 | OS1 | 0 | 2 | X |

Because it is assumed for clarity that each of Task0-Task4 were assigned (made a valid task) in order, the Transition Position indicators in Table 6 for Task2 is displayed as "1" and the Transition Position indicator for Task4 is displayed as "2" because each of these tasks is to initially execute in the same ordering scope. According to an embodiment, use of the Transition Position indicators is used to allow the ordering scope manger 116 to ensure that tasks executing in the same ordering scope finish execution in same order that they began execution.

The Exclusive Position indicators of Task3 and Task4 are displayed as "X" at Table 6 because these tasks do not need to execute exclusively, and therefore the field Exclusive Position has no meaning to these entries. The Exclusive Position indicator of Task1 is zero (0) to indicate that it is the next task to be exclusively enabled to operate in OS4. The Exclusive indicator of Task2 is one (1) to indicate that there was one other task (Task0) exclusively executing in its pending ordering scope (OS1) at the time Task2 was assigned. Thus, Task2 cannot be enabled to be executed by its respective core until Task0 has completed execution. The value of an exclusive task's Exclusive Position indicators can be determined based upon the order that the task was created, or any other criteria.

Table 7 and Table 8 are task tables for cores 118 and 119 that correspond to the ordering scope table of TABLE 6. In particular, according to Table 7, the packet data DP2 and DP4 have been assigned to Task1 and Task2, respectively, both of which are assigned to core 118 for execution. According to Table 7, the packet data DP3 and DP5 have been assigned to Task3 and Task4, respectively, both of which are assigned to core 119 for execution.

TABLE 7

Task Table 124 for Processor Core 118 (Time T1)

| Task | Data Packet | Inhibit | Speculative/Yield | Order Scopes |
|---|---|---|---|---|
| Task0 | DP1 | 0 | 1 | OS1, OS2, OS3 |
| Task1 | DP2 | 1 | 1 | OS4, OS5 |
| Task2 | DP4 | 0 | 1 | OS1, OS2, OS3 |

TABLE 8

Task Table 124 of Processor Core 119 (Time T1)

| Task | Data Packet | Inhibit | Speculative/Yield | Order Scopes |
|---|---|---|---|---|
| Task3 | DP3 | 0 | 1 | OS6, OS7, OS8 |
| Task4 | DP5 | 0 | 1 | OS1, OS2, OS3 |

As described above, the ordering scope manager 116 updates the ordering scope table 122 to identify current and pending tasks as they are enabled. In an embodiment, the ordering scope manager 116 can evaluate each one of the active tasks in the order it was created to determine whether it should be enabled. At time T2, as indicated at ordering scope table represented by Table 9, all active tasks have been evaluated resulting in all tasks being current tasks, as indicated by an Exclusive Position indicator of either "0" or "X", except for Task2, as indicated by the Exclusive Position indicator of "1". In particular, Task2 is pending, but not current, because enabling Task2 would result in both Task0 and Task2 operating exclusively in OS1, thus violating the enablement criteria. The Transition Position of each current task has been set as of time T2 to indicate the order that tasks were assigned to the ordering scope table relative to when other tasks were assigned with the same ordering scope to the table. Thus, each of tasks Task0, Task1, and Task3 has a value of zero at their Transition Position field because for the set of illustrated active tasks they are each the first-in-order task executing their respective ordering scopes. Task2, however, has a Transition Position indicator of 1 to indicate that it is the second-in-order task executing in its respective ordering scope (OS1). E.g., Task0 is also executing in OS1. Task4 has a Transition Position indicator of 2 to indicate that it is the third-in-order task executing in its respective ordering scope (OS1). E.g., Task0 and Task2 are also assigned OS1.

TABLE 9

Ordering scope table (Time T2)

| Task | OS ID | Exclusive | Trans. Pos. | Excl. Pos. |
|---|---|---|---|---|
| Task0 | OS1 | 1 | 0 | 0 |
| Task1 | OS4 | 1 | 0 | 0 |
| Task2 | OS1 | 1 | 1 | 1 |
| Task3 | OS6 | 0 | 0 | X |
| Task4 | OS1 | 0 | 2 | X |

Because each of Task0, Task1, Task3, and Task4 have their Exclusive Position indicator set to 0 or X, the ordering scope manager 116 can have sent enable signals to their respective processor cores to enable their execution, and therefore are presumed to be current tasks. In response to receiving enable signals, the processor cores 118 and 119 can update their respective task tables. Thus, as shown in Table 10 and Table 11, the inhibit bit is negated, e.g., set to zero (0), for Task0, Task1, Task3, and Task4, while the inhibit bit remains asserted for Task2.

TABLE 10

Task Table 124 for Processor Core 118 (Time T2)

| Task | Data Packet | Inhibit | Speculative/Yield | Order Scopes |
|---|---|---|---|---|
| Task0 | DP1 | 0 | 1 | OS1, OS2, OS3 |
| Task1 | DP2 | 1 | 1 | OS4, OS5 |
| Task2 | DP4 | 0 | 1 | OS1, OS2, OS3 |

TABLE 11

Task Table 124 of Processor Core 119 (Time T2)

| Task | Data Packet | Inhibit | Speculative/Yield | Order Scopes |
|---|---|---|---|---|
| Task3 | DP3 | 0 | 1 | OS6, OS7, OS8 |
| Task4 | DP5 | 0 | 1 | OS1, OS2, OS3 |

Once enabled, the processor cores 118 and 119 can start executing the enabled tasks on a task-by-task basis without further intervention from the ordering scope manager. According to an embodiment, the enabled tasks are executed by their respective cores in the order that they reside in their core's task table. For example, if processor core 118 were to begin executing a task based on the information of Table 10, it would begin execution of Task0 by virtue of Task0 being enabled/non-inhibited (inhibit bit set to zero) and by virtue of Task0 being the first entry in task table 124. Similarly, processor core 119 would begin execution of Task3 by virtue of Task3 being enabled (inhibit bit set to zero) and being the first entry in task table for processor core 119.

Figure 2:
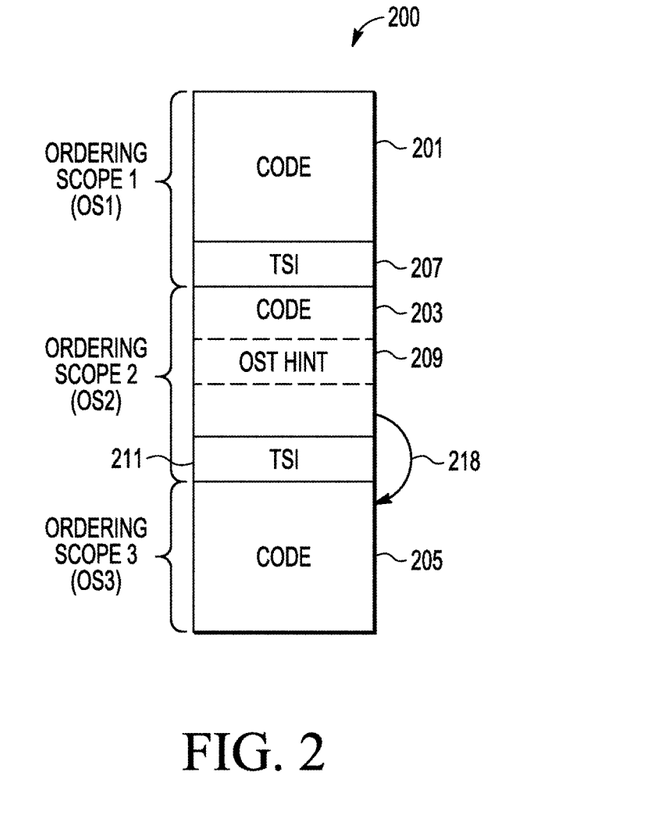
FIG. 2 illustrates the set of instructions of a task executed in a processor core of the data processing system of FIG. 1 in accordance with at least one embodiment of the present disclosure.

The enabled processor cores 118 and 119 can begin execution of a task by loading the program code, e.g., instructions, for their respective task. For example, FIG. 2 illustrates a set of instructions 200 being executed at processor core 118, wherein the set of instructions 200 corresponds to Task0, and includes three code portions 201, 203, and 205 (code portions 201-205), each of which correspond to a different ordering scope, such as ordering scopes OS1, OS2, and OS3. The last command of each of the task portions is a task switch instruction (SWI) that indicates the processor core 118 can perform a task switch.

In an embodiment, at time T0 (Table 10) the processor core 118 has begun executing the code 201 in ordering scope OS1, and when the Speculative/Yield bit 126 of the task table 124 is asserted (as discussed in more detailed below), execution of the task switch instruction 207 will cause core 118 will perform a full task switch in response to executing the task switch instruction 207 at the end of the ordering scope OS1. In addition, according to an embodiment, the task switch instruction 207 will cause the processor core 118 to send to the ordering scope manager 116 a signal requesting that the processor core 118 be allowed to complete the execution of ordering scope OS1. Also, the information sent to the processor core 118 can include information identifying the next ordering scope of its current task, which is ordering scope OS2 of Task0 as indicated in Table 10 (the task table 124 of core 118). This request can also include an indicator as to whether the processor core 118 wants to execute exclusively or non-exclusively in ordering scope OS2.

When authorized by the ordering scope manager 116 to complete execution of the current ordering scope, the core 118 will assert the inhibit bit 128 associated with the task table 124 as shown in Table 12 below at time T4. Note that OS1 is struck-through in Table 12 to indicate that the task has finished executing OS1, and that the next-in-order ordering scope, OS2, is now the pending ordering scope for Task0.

TABLE 12

Task Table 124 for Processor Core 118 (Time T4)

| Task | Data Packet | Inhibit | Speculative/Yield | Ordering Scopes |
|---|---|---|---|---|
| Task0 | DP1 | 1 | 1 | ~~OS1~~, OS2, OS3 |
| Task1 | DP2 | 0 | 1 | OS4, OS5 |
| Task2 | DP4 | 1 | 1 | OS1, OS2, OS3 |

Based upon the information sent in response to a task switch instruction, the ordering scope manager 116 can determine whether to authorize core 118 to complete a task in a particular ordering scope by determining if in-order execution, relative the task's ordering scope, will be maintained if the task is authorized to complete executing in its current ordering scope. According to an embodiment, this can be determined based on the Transition Position indicators of those current tasks executing in the same ordering scope. For example, if Task0 is the oldest task in-execution-order executing OS1, which includes being the only task executing OS1, the ordering scope manager 116 allows the processor core 118 to complete the ordering scope OS1. Otherwise, the order scope manager 116 withholds authorization until any older tasks in the same ordering scope have been completed.

When the ordering scope manager 116 authorizes processor core 118 to complete ordering scope OS1 of Task0, the ordering scope manager 116 can update Task0 in ordering scope table 122 as indicated at Table 13 to identify OS2 as the next-in-order ordering scope, at field OS ID, for Task0, and to negate the Exclusivity field of Task0, assuming the call made by processor core 118 indicated non-exclusive execution of the next ordering scope OS2. Note that the Transition Position indicator for Task0 is 0 because Task0 is the only task in the ordering scope table currently associated with ordering scope OS2, and the Exclusive Position indicator for Task0 is X because Task0 is to execute non-exclusively with respect to OS2.

TABLE 13

Ordering scope table (Time T5)

| Task | OS ID | Exclusive | Trans. Pos. | Excl. Pos. |
|---|---|---|---|---|
| Task0 | OS2 | 0 | 0 | X |
| Task1 | OS4 | 1 | 0 | 0 |
| Task2 | OS1 | 1 | 0 | 1 |
| Task3 | OS6 | 0 | 0 | X |
| Task4 | OS1 | 0 | 1 | X |

The ordering scope manager 116 can further determine whether Task0 operating in OS2 can be enabled for the next-in-order ordering scope, as discussed above. In the present example, Task0 is enabled for ordering scope OS2 by virtue of Task0 being the only task in task table 124 executing in OS2. Thus, the ordering scope manager 116 can send an enable signal to the processor core 118 authorizing execution of Task0. The ordering scope manager 116 can also update, if needed, the Transition Position and Exclusive Position fields for other tasks in the ordering scope table in response to the ordering scope transition for Task0. For example, the Transition Position fields of Task1 and Task3 remain set to zero (0) by virtue of these tasks being the only tasks executing their respective ordering scope, e.g., OS4 and OS6. As shown in Table 13, the Transition Position field of Task2, relative to its ordering scope, is set to zero (0) by virtue of Task2 now being the first-in-transition-order task for OS1 based on Task0 transitioning from OS1 to OS2, and the Transition Position field of Task4, relative to its ordering scope, is set to one (1) by virtue of Task4 now being the second-in-transition-order task for OS1. (Note that a task that is first-in-transition-order task for a given ordering scope will execute in the given ordering scope before any other task executes in the given ordering scope. The term "first-in-transition-order" and "next in-transition-order", as used herein, are synonymous terms.)

Shown in Table 14, is that the Exclusive Position indicator of Task2 has been changed to zero (0), therefore indicating that the ordering scope manager 116 has authorized Task2 to exclusively operate in OS1 subsequent to authorizing Task0 to complete execution in OS1. Note that Task2 is enabled in response to meeting the enablement criteria described above due to Task0 no longer exclusively operating in OS1. Also at Time T6 processor core 118 has been authorized to execute Task2.

TABLE 14

Ordering scope table (Time T6)

| Task | OS ID | Exclusive | Trans. Pos. | Excl. Pos. |
|---|---|---|---|---|
| Task0 | OS2 | 0 | 0 | X |
| Task1 | OS4 | 1 | 0 | 0 |
| Task2 | OS1 | 1 | 0 | 0 |
| Task3 | OS6 | 0 | 0 | X |
| Task4 | OS1 | 0 | 1 | X |

After completing execution in OS1, processor core 118 determines a next task to begin executing. Note that the next task can be the same task as was just finished but operating in a different ordering scope. At time T7, as indicated at Table 15, the Inhibit bits of Task0-Task2 have been negated to indicate that the processor core 118 has been authorized by the ordering scope manager 116 to execute in any of the tasks Task0-Task2.

TABLE 15

Task Table 124 for Processor Core 118 (Time T7)

| Task | Data Packet | Inhibit | Speculative/Yield | Order Scopes |
|---|---|---|---|---|
| Task0 | DP1 | 0 | 1 | ~~OS1,~~ OS2, OS3 |
| Task1 | DP2 | 0 | 1 | OS4, OS5 |
| Task2 | DP4 | 0 | 1 | OS1, OS2, OS3 |

Assuming an embodiment where the processor core 118 will preferentially execute the first available task in its task table, processor core 118 will execute Task0, which is the same task for which the processor core 118 just performed the task switch instruction 207. This will result in the context information that was just stored in response to the task switch being reloaded. While it is common for task switch operations to be highly efficient in terms of required clock cycles, the unnecessary storing and retrieving of task context information is inefficient. Once the context of Task0 is restored from context memory, the processor core 118 starts execution of the code 203 (ordering scope OS2) as illustrated at FIG. 2.

According to an embodiment of the present disclosure, a task switch instruction occurs at the end of each ordering scope. As described in the embodiment below, execution of the task switch instruction can result in the processor core selectively storing or not storing task context information depending the state of the Speculative/Yield bit in the task table for the task being completed, as opposed to the task switch instruction always causing task context information to be saved.

According to an embodiment, to facilitate more efficient task switching, the processor core 118 can send an ordering scope transition hint to the ordering scope manager 116 prior to the execution of a task switch instruction of the current ordering scope to determine in advance whether context information for the task needs to be stored at the end of its current ordering scope. For example, the code 203 of ordering scope OS2 can include an ordering scope transition hint instruction 209 located prior to the task switch instruction 211 of ordering scope OS2. When the processor core 118 executes the ordering scope transition hint instruction 209, the processor core 118 can provide information to the ordering scope manager 116, and the information can be an indication the current ordering scope and the next-in-order ordering scope of the current task. For example, the ordering scope transition hint instruction 209 can include the ordering scope ID, e.g., OS2, for the current ordering scope, and an ordering scope ID, e.g., OS3, for the next-in-order ordering scope.

In another embodiment, the ordering scope transition hint instruction 209 can include only the ordering scope ID for either the current ordering scope OS2 or the ordering scope ID for the next-in-order ordering scope OS3, wherein, the ordering scope manager 116 can determine the other ordering scope ID by knowing that the ordering scope IDs for a task are consecutive. For example, the ordering scope manager 116 can either add one or subtract one from the received ordering scope ID to determine the other ordering scope ID. The ordering scope transition hint instruction 209 can be executed and the information indicating the current ordering scope and the next-in-order ordering scope of the current task can be sent at least a predetermined number of instructions or system cycles before the task switch instruction of the current ordering scope.

The ordering scope manager 116 can receive the information indicating the current ordering scope, OS2, and the next-in-order ordering scope, OS3, and can then determine whether the current task, Task0, of the instruction pipeline 200 is the next in-transition-order task relative to its execution in the current ordering scope, OS2. Whether Task0 is the next in-transition-order task can be determined based on the Transition Position entries in the ordering scope table 122. In an embodiment, the task that is the next in-transition-order task for a particular ordering scope is the task that has a transition position entry equal to a predetermined value, e.g., zero, or the lowest value of all Transition Position entries having the same ordering scope. Thus, in response to ordering scope manager 116 determining that Task0 is the next in-transition-order task for ordering scope OS2, and therefore can complete executing in OS2, the ordering scope manager 116 can evaluate other entries of the ordering scope table 122 to determine if any other processor core, e.g., processor core 119, executing Task0, can also be authorized to execute the next-in-order ordering scope OS3. In the present example, the ordering scope manager 116 makes this determination by searching the task entries of the ordering scope table 122 to determine whether any other entry in the ordering scope table 122 includes the ordering scope OS3 in its OS ID field.

TABLE 16

Ordering scope table (Time T8)

| Task | OS ID | Exclusive | Trans. Pos. | Excl. Pos. |
|---|---|---|---|---|
| Task0 | OS2 | 0 | 0 | X |
| Task1 | OS4 | 1 | 0 | 0 |
| Task2 | OS1 | 1 | 0 | 0 |
| Task3 | OS6 | 0 | 0 | X |
| Task4 | OS1 | 0 | 1 | X |

If ordering scope OS3 is not found in the ordering scope table 122, such as in Table 16, above, the ordering scope manager 116 can send a no task switching ordering scope (NTS OS) transition signal to the processor core 118 for the ordering scope OS3 of the current Task0 to indicate it is not necessary for the task switch instruction 211 to actually store the task context information of the current task when performing the ordering scope transition from OS2 to OS3. The ordering scope manager 116 can also update OS ID for Task0 in the ordering scope table 122 from OS2 to OS3, as shown in Table 17 below at time T9, to identify OS3 as the current ordering scope.

TABLE 17

Ordering scope table (Time T9)

| Task | OS ID | Exclusive | Trans. Pos. | Excl. Pos. |
|---|---|---|---|---|
| Task0 | OS3 | 0 | 0 | X |
| Task1 | OS4 | 1 | 0 | 0 |
| Task2 | OS1 | 1 | 1 | 0 |
| Task3 | OS6 | 0 | 0 | X |
| Task4 | OS1 | 0 | 0 | X |

However, if in response to the information sent by the ordering scope transition hint instruction 203 the ordering scope manage determines that the next ordering scope (OS3) of Task0 already resides in the ordering scope table 122, the ordering scope manager 116 will not send the NTS OS transition signal to the processor core 118. However, when the NTS OS transition signal is sent to the processor core 118 and the ordering scope table 122 is updated to include OS3 for Task0, the ordering scope manager 116 will ignore any ordering scope transition hint signals from other processor cores that identify ordering scope OS3 as the next-in-order ordering scope for its corresponding task.

In another embodiment, if ordering scope OS3 is found in the OS ID field of another task in the ordering scope table 122, the ordering scope manager 116 can then determine whether the other task is operating exclusively in OS3, and, if so, will not send the NTS OS transition signal to the processor core 118. However, if the other task is not exclusive with respect to ordering scope OS3 the ordering scope manager 116 can send the NTS OS transition signal to the processor core 118 for the ordering scope OS3 of the current Task0, and can update the ordering scope for the Task0 in the ordering scope table 122 to ordering scope ID OS3 as shown in Table 17 above.

In another embodiment, if the information provided by the processor core 118 to the ordering scope manager 116 indicates that the next-in-order ordering scope of the current task is to be non-exclusively executed in the processor 118, the ordering scope manager 116 can check only whether the current task is the next in-transition-order task for current ordering scope. In this embodiment, in response to ordering scope manager 116 determining that Task0 is the next in-transition-order task for ordering scope OS2, and therefore can complete executing in OS2, the ordering scope manager 116 can send the NTS OS transition signal to the processor core 118 for the ordering scope OS3 of the current Task0, and can update the ordering scope for the Task0 in the ordering scope table 122 to ordering scope ID OS3 as shown in Table 17 above. Otherwise, in response to ordering scope manager 116 determining that Task0 is not the next in-transition-order task for ordering scope OS2, and therefore cannot complete executing in OS2, the ordering scope manager 116 will not send the NTS OS transition signal to the processor core 118.

When the processor core 118 receives the NTS OS transition signal, the processor core 118 can set the Speculative/Yield bit 126 for Task0 to zero (0) as shown in Table 18 below at Time T10.

TABLE 18

Task Table 124 for Processor Core 118 (Time T10)

| Task | Data Packet | Inhibit | Speculative/Yield | Order Scopes |
|------|-------------|---------|-------------------|--------------|
| Task0 | DP1 | 0 | 0 | ~~OS1,~~ OS2, OS3 |
| Task1 | DP2 | 0 | 1 | OS4, OS5 |
| Task2 | DP4 | 1 | 1 | OS1, OS2, OS5 |

Note that according to the specific embodiment that the task switch instruction (TSI) can be performed completely, wherein the task context is saved, or can be performed partially, wherein the task context is not saved. It will be appreciated however, that this functionality, which selectively saves or does not save the context of a task, can be implemented in various other manners. For example, in an embodiment the task switch can be implemented as a particular operation of an ordering scope transition instruction (OSTI), wherein the task switch operation is selectively implemented, e.g., implemented or not implemented, by the OSTI based upon the Speculative/Yield bit. For example, if the Speculative/Yield bit is asserted (set to one (1)), the OSTI will provide information to the ordering scope manager that requests permission to terminate the current task, and information that further identifies the next ordering scope that the task will execute in. When authorized by the ordering scope manager 116 to complete execution in the current ordering scope, the OSTI instruction will execute a task switch instruction that causes the context of the current task to be saved, and the context of the next task to be executed to be loaded. It will be appreciated that this can result in the same context information being saved and loaded as part of an ordering scope transition.

If instead, however, the Speculative/Yield bit is negated (set to zero (0)), the OSTI can provide information to the ordering scope manager 116 that requests permission to terminate the current task, and that identifies the next ordering scope that the task will execute in. However, when authorized by the ordering scope manager 116 to complete execution in the current ordering scope, the OSTI will not store the context data of the current task to context memory, but instead will immediately begin executing the current task in its next ordering scope, thus saving the time and energy otherwise used saving and restoring the task's context information. Because there are multiple ways to save or not save task context information, the term "performing a task switch", as used herein with respect to transitioning from a task executing in a current ordering scope, is intended to mean that context information of the processor core executing the task in the current ordering scope is saved so that the context information can be subsequently retrieved to restore the processor core to the same context state. The terms "without performing a task switch", "not performing a task switch", "ignoring a task switch", and their variants, as used herein with respect to transitioning from a task executing in a current ordering scope, is intended to mean that context information of the processor core executing the current task is not saved for subsequent retrieval.

The ordering scope transition hint from the processor core 118 to the ordering cope manager 116 and the NTS OS transition signal from the ordering scope manager 116 to the processor core 118 is referred to as hints because the processor core 118 is giving the ordering scope manager 116 information in advance as to the next ordering scope that the current task will need to operate in. Note, however, that there is no guarantee that the Speculative/Yield bit 126 will be set to zero (0) before the task switch instruction is executed for the current ordering scope. In an embodiment, there may be a situation in which the current task, Task0, in the processor core 118 could be the next in-transition-order task for the current ordering scope OS2, but the Speculative/Yield bit 126 is still asserted when the task switch instruction 211 is to be executed. In this situation, the ordering scope transition from ordering scope OS2 to ordering scope OS3 is performed with the execution of the task switch instruction 211. There are a number of factors in the processor 102 that can affect whether the Speculative/Yield bit 126 is set to zero (0) before the task switch instruction 211 is executed. For example, the ordering scope transition hint indicating the ordering scope ID for the next-in-order ordering scope in the set of instructions 200 in the processor core 118 may not be sent to the ordering scope manager 116 early enough to be resolved by the ordering scope manager 116 in time to generate the NTS OS transition signal before the task switch instruction is executed, or the like. Additionally, the lack of a NTS OS transition signal does not guarantee that a different task will be executed at the processor core 118, only that the ordering scope manager 116 wasn't able to guarantee the same task would continue to execute.

Figure 3:
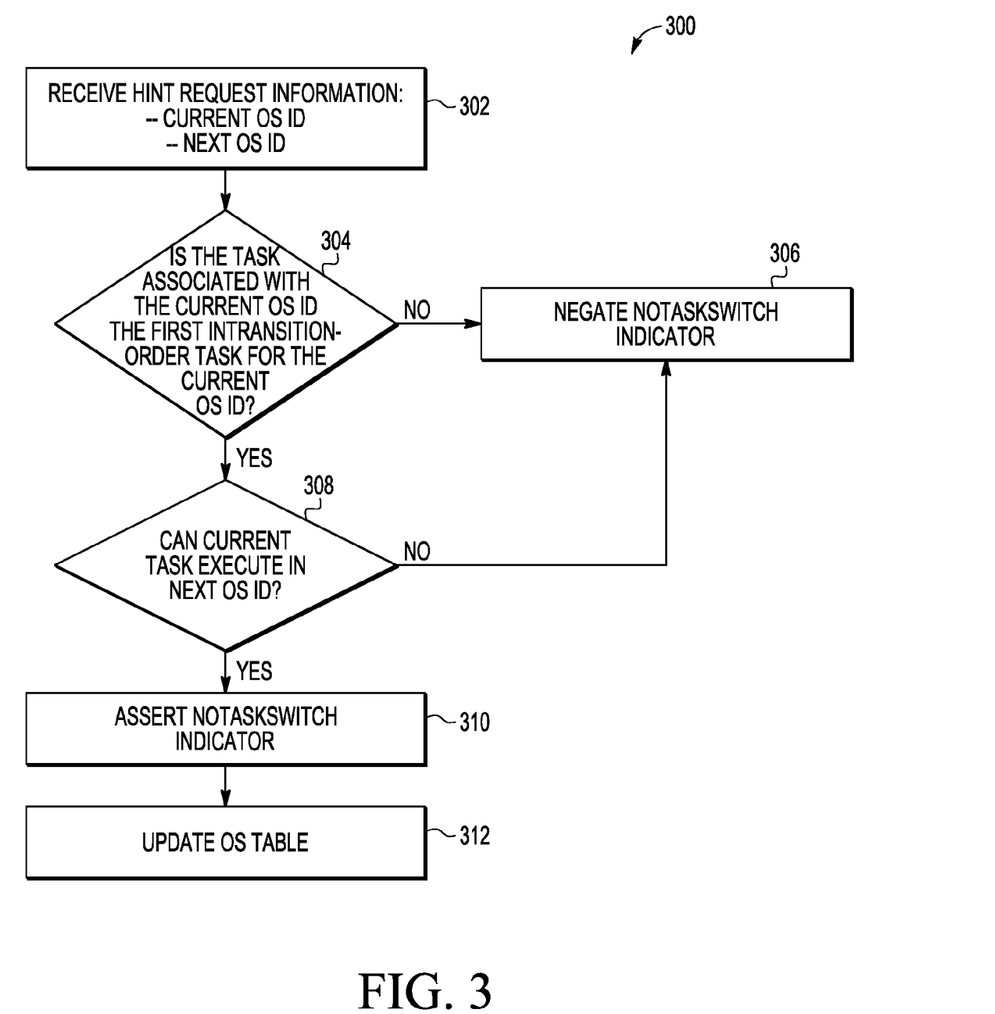
FIG. 3 illustrates a flow diagram of a method for determining at an ordering scope manager whether a processor core implementing an ordering scope transition can ignore a task switch instruction.

FIG. 3 illustrates a flow diagram of a method 300 for determining, at an ordering scope manager, whether a processor core implementing an ordering scope transition can ignore a task switch. At block 302, hint request information from the processor core is received at hardware module circuitry. The hint request information can be used to determine a current ordering scope identifier of the data processor's current task and the next in-order ordering scope of the current task. In an embodiment, the hardware module circuitry is the ordering scope manger 116, and the hint request information is sent as part of an ordering scope transition hint signal during execution of a current ordering scope at the processor core.

A determination is made at block 304 whether the current task is the first-in-transition-order task for the current ordering scope identifier. The current task can be determined to be the first-in-transition-order task for the current ordering scope identifier if a transition position indicator for the current task in the order scope table indicates the task is the next task that is to complete execution of its current ordering scope. For example, referring to the previous tables, the Transition Position indicator is set to a particular value, e.g., zero, to indicate a task is to complete execution of the indicated ordering scope before other tasks executing in the same ordering scope. Flow proceeds from block 304 to block 306 in response to the current task not being the first-in-transition order task for the current ordering scope, where a NoTaskSwitch Indicator is negated. When the NoTaskSwitch Indicator is negated, a processor core can set its Speculative/Yield bit for the task to one (1) such that the processor core will perform a task switch during the ordering scope transition of the task. (It will be appreciated that when the Speculative/Yield bit of a processor is a one (1) by default, it is not necessary for a negated NoTaskSwitch indicator to be sent). If, however, the current task is the first in-transition-order task for the current ordering scope it is an indication that the task associated with the hint can be completed, and the hint is further evaluated at block 308.

At block 308, it is determined whether the current task can execute in the next ordering scope ID. For example, when the next-in-order ordering scope for the current is found in the ordering scope table, which indicates another task is already associated with the same ordering scope, the current task cannot execute in the next ordering scope and flow proceeds to block 306, otherwise flow proceeds to block 310. It will be appreciated that the determination of block 308 can be made on other, more complex, criterion as described previously. At block 310, a NoTaskSwitch indicator is asserted, thereby indicating that the processor core is authorized to ignore the task switch of the next ordering scope transition. According to an embodiment, in response to the NoTaskSwitch Indicator being asserted, the processor core can set a Speculative/Yield bit for the task to zero (0) to indicate that the processor core will not perform a task switch during the ordering scope transition of the task. Next at block 312, the hardware module circuitry updates the ordering scope table. For example, if the hint was for the processor core to ignore the next task switch when transitioning from Task0 executing in ordering scope OS2 to executing in ordering scope OS3, the ordering scope table would be updated to include in data in table 19 below.

TABLE 19

Ordering scope table

| Task | OS ID | Exclusive | Trans. Pos. | Excl. Pos. |
|------|-------|-----------|-------------|------------|
| Task0 | OS3 | 0 | X | X |
| Task1 | OS4 | 1 | 0 | 0 |
| Task2 | OS1 | 1 | 0 | 0 |
| Task3 | OS6 | 0 | 0 | X |
| Task4 | OS1 | 0 | 1 | X |

Figure 4:
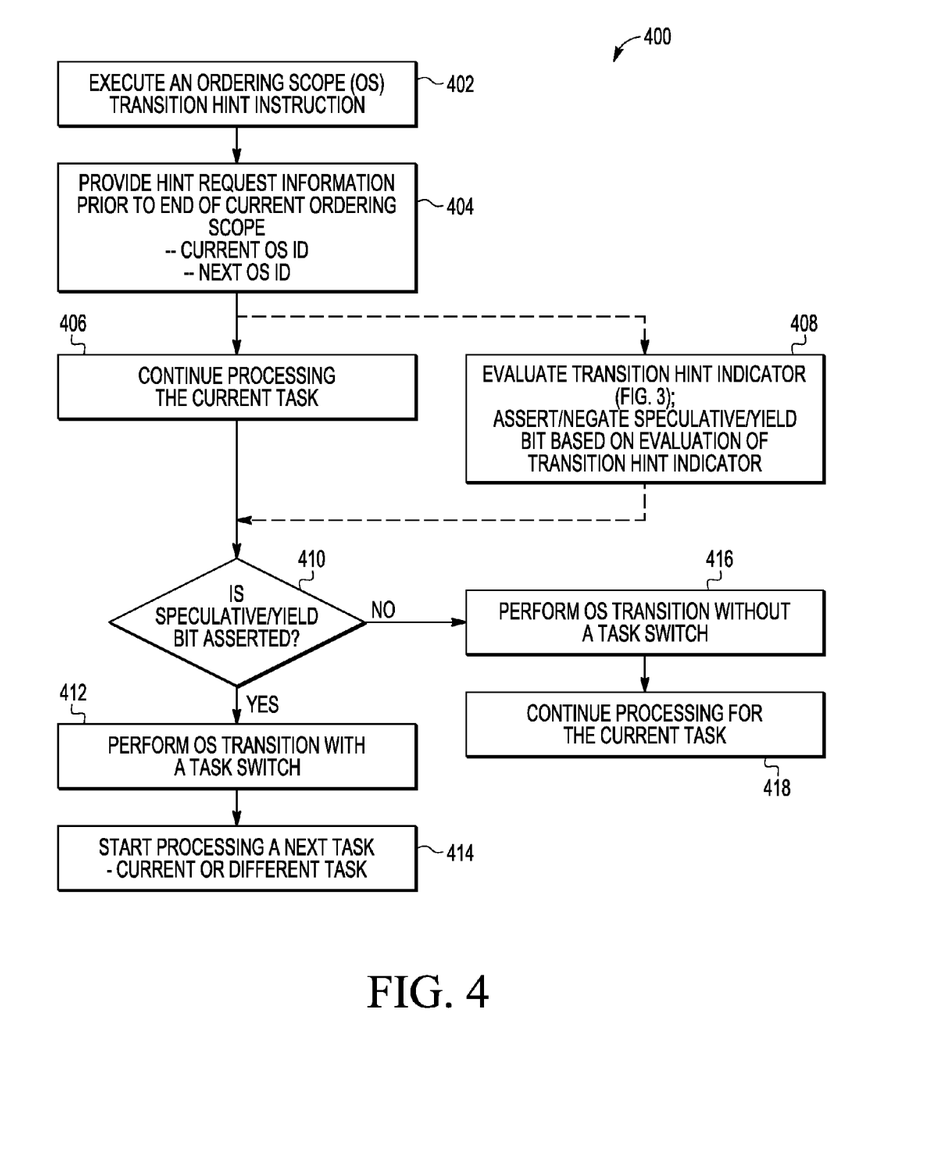
FIG. 4 illustrates a flow diagram of another method for conditionally performing an ordering scope transition without task switching in accordance with at least one embodiment of the present disclosure.

FIG. 4 illustrates a flow diagram of a method 400 for conditionally performing an ordering scope transition while ignoring a task switch in accordance with at least one embodiment of the present disclosure. At block 402, an ordering scope transition hint instruction is executed. In an embodiment, the ordering scope transition hint instruction can be executed in a processor core. The ordering scope transition hint instruction can be located ahead of a task switch instruction in an instruction pipeline. At block 404, hint request information is sent from the processor core to an ordering scope manager. The hint request information includes an indication of a current ordering scope identifier of the processor core's current task and the next in-order ordering scope of the current task. The current task is continued to be executed by the software of the processor core at block 406.

While the current task continues to execute in the current ordering scope, the flow also continues at block 408, which can correspond to the flow described above with respect to FIG. 3, wherein the ordering scope manager evaluates the hint generated by the ordering scope transition hint instruction to determine whether a task switch needs to be performed, and the processor core either asserts or negates a corresponding Speculative/Yield bit accordingly. Thus, in response to block 408, the processor core is notified to either negate or assert its Speculative/Yield bit. The Speculative/Yield bit is negated, based on the NoTaskSwitch Indicator of FIG. 3 being asserted, to indicate that the next task switch can be ignored, e.g., because the next ordering scope of the task is the next-in-order ordering scope in an ordering scope table. Otherwise, the core is notified to assert its Speculative/Yield bit (based on the NoTaskSwitch Indicator being negated) if the task switch cannot be ignored, e.g., the task switch instruction is completed. (It will be appreciated that this may be the default position, in which case no action is needed). At block 410, upon reaching the end of the current task, the core determines if the Speculative/Yield bit is asserted. If so, flow proceeds to block 412, and the ordering scope transition is performed with a full task switch before continuing processing at block 414, which includes starting execution oaf next task that can be either the current task or a different task that is selected by the processor. Otherwise, if the core determines that the Speculative/Yield bit is negated, flow proceeds to block 416, and the ordering scope transition is performed without a full task switch before processing continues at block 418, which includes continuing to process the current task.

The process of providing a hint to the processor core can be performed with respect to both an ordering scope transition as described above and also with respect to a semaphore lock transition. During a semaphore operation the semaphore unit can perform the same operations as the ordering scope manager. However, for simplicity these operations have been discussed only with respect to an ordering scope manager and ordering scope transitions.

In accordance with one aspect of the present disclosure, a method is disclosed. The method includes receiving, by hardware module circuitry, an indication of a first ordering scope identifier for a current ordering scope of a task currently being executed by a processor core and a second ordering scope identifier for a next-in-order ordering scope of the task. The method also includes providing a no task switch indicator from the hardware module circuitry to the processor core in response to determining that the task is a first-in-transition-order task for the first ordering scope identifier and that the second ordering scope identifier is not found in an ordering scope table. The method further includes transitioning the processor core from executing in the current ordering scope to executing in the next-in-order ordering scope without performing a task switch in response to the no task switch indicator being provided.

In one embodiment, the indication of the first and second ordering scope identifiers is sent a predetermined number of instructions before a task switch of the task. In one embodiment, the indication of the first and second ordering scope identifiers are received prior to a last instruction of the current ordering scope of the task being executed.

In one embodiment, the method includes asserting a speculative bit for the task in a task table of the processor core prior to the first and second ordering scope identifiers being received by the hardware module circuitry. In one embodiment, a task switch will occur for a task switch instruction in response to the task having an asserted speculative bit. In a further embodiment, the method further includes receiving, at the processor core, the no task switch indicator. The method also includes negating the speculative bit for the task in the task table of the processor core in response to receiving the no task switch indicator. In one embodiment, a task switch will not occur for the task switch instruction in response to the task having a negated speculative bit.

In one embodiment, the method includes receiving a data packet prior to receiving the indication of the first ordering scope identifier. The method also includes determining a program to process information of the data packet. The method further includes assigning the data packet and the program to the task. The method also includes assigning the task to the processor core. In a further embodiment, the method includes storing a task identifier of the task in a task table of the processor core prior to receiving the indication of the first ordering scope identifier. The method also includes marking the task as inhibited in the task table. In an embodiment, the task is not executed when the task is marked as inhibited. The method also includes asserting a speculative bit for the task in the task table to indicate that the task switch is to be performed when transitioning the processor core from executing in the current ordering scope to executing in the next-in-order ordering scope. The method further includes marking the task as enabled at the task table in response to a signal from the hardware module circuitry.

In accordance with one aspect of the present disclosure, a data processing system is disclosed. In one embodiment, the data processing system includes a processor core to execute instructions, and to send an indication of a first ordering scope identifier for a current ordering scope of a task currently being executed by the processor core and a second ordering scope identifier for a next-in-order ordering scope of the task. The data processing system also includes an ordering scope manager hardware module circuitry to communicate with the processor core. The ordering scope manager hardware module circuitry is configured to receive the indication of the first and second ordering scope identifiers from the processor core, and to provide a no task switch indicator to the processor core in response to determining that the task is a first-in-transition-order task for the first ordering scope identifier and that the task is next in line, relative to other tasks, to execute in the second ordering scope. The processor core is also configured to transition from executing in the current ordering scope to executing in the next-in-order ordering scope without performing task switch in response to the no task switch indicator being provided.

In one embodiment, the processor core is configured to send the indication of the first and second ordering scope identifiers a predetermined number of instructions before a task switch of the task. In one embodiment, an ordering scope table of the hardware module circuitry includes entries identifying ordering scopes currently being executed by the processor core and by other processor cores in the data processing system. In one embodiment, the processor core is further configured to assert a speculative bit for the task in a task table of the processor core prior to the indication of the first and second ordering scope identifiers of the task being received by the hardware module circuitry. In one embodiment, an asserted speculative bit indicates that a task switch is to be performed in response to being requested.

In one embodiment, the processor core receives the no task switch indicator, and is configured to negate the speculative bit for the task in the task table in response to receiving the no task switch indicator. In one embodiment, a task switch will not occur for a task switch instruction in response to the task having a negated speculative bit.

In one embodiment, the data processing system further includes a work scheduler circuitry configured to communicate with the ordering scope manager hardware module circuitry. The work scheduler circuitry is configured to receive a data packet, to assign the data packet to the task, and to assign the task to the processor core. In a further embodiment, the processor core is configured to store information for the task in a task table of the processor core, is configured to mark the task as inhibited in the task table, and to assert a speculative bit for the task in the task table. In one embodiment, a task switch will occur for a task switch instruction when the processor core transitions from executing in the current ordering scope to executing in the next-in-order ordering scope in response to the task having an asserted speculative bit. The processor core is further configured to mark the task as enabled at the task table in response to a signal from the hardware module circuitry.

In accordance with one aspect of the present disclosure, another data processing system is disclosed. The data processing system includes work scheduler circuitry configured to assign a task to data of data packet. The data processing system also includes a processor core configured to communicate with the work scheduler. The processor core is configured to execute instructions, and to send an indication of a first ordering scope identifier for a current ordering scope of the task, in response to the task being currently executed by the processor core. The processor core is also configured to provide an indication of a second ordering scope identifier for a next-in-order ordering scope of the task. The data processing system further includes an ordering scope manager hardware module circuitry configured to communicate with the processor core. The ordering scope manager is configured to receive the indications of the first and second ordering scope identifiers from processor core, and to provide a no task switch indicator to the processor core in response to determining that the task is a first-in-transition-order task for the first ordering scope identifier and that the processor core is authorized to execute the next-in-order ordering scope. The processor core is configured to transition from executing in the current ordering scope to executing in the next-in-order ordering scope without performing task switch in response to the no task switch indicator being provided.

In one embodiment, the processor core is configured to send the indications of the first and second ordering scope identifiers a predetermined number of instructions before a task switch instruction of the task. In one embodiment, the ordering scope manager hardware module circuitry includes an ordering scope table, which in turn includes entries identifying ordering scopes currently being executed by the processor core and by other processor cores in the data processing system.

In one embodiment, the processor core is configured to assert a speculative bit for the task in a task table of the processor core prior to the indications of the first and second ordering scope identifiers being received by the hardware module circuitry. In one embodiment, a task switch will occur for a task switch instruction in response to the task having an asserted speculative bit.

In one embodiment, the processor core is configured to negate the speculative bit for the task in the task table in response to receiving the no task switch indicator. In one embodiment, a task switch will not occur for the task switch a negated speculative bit indicates that a task switch is not to be performed. In one embodiment, the processor core is configured to store the task in a task table of the processor core, configured to mark the task as inhibited in the task table, and to assert a speculative bit for the task in the task table. In one embodiment, a task switch will occur when the processor core transitions from executing in the current ordering scope to executing in the next-in-order ordering scope in response to the task having an asserted speculative bit. The processor core is further configured to mark the task as enabled in response to a signal from the ordering scope manager hardware module circuitry.

Based upon the description herein, it will be appreciated that the preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method comprising:
   receiving, by a hardware module circuitry, an indication of a first ordering scope identifier for a current ordering scope of a task currently being executed by a processor core and a second ordering scope identifier for a next-in-order ordering scope of the task;
   in response to determining that the task is a first-in-transition-order task for the first ordering scope identifier and that the second ordering scope identifier is not found in an ordering scope table, providing a no task switch indicator from the hardware module circuitry to the processor core, wherein the ordering scope table of the hardware module circuitry includes entries identifying ordering scopes currently being executed by the processor core and by other processor cores in data processing system; and
   in response to the no task switch indicator being provided, transitioning the processor core from executing in the current ordering scope to executing in the next-in-order ordering scope without performing a task switch.

2. The method of claim 1 wherein the indication of the first and second ordering scope identifiers are sent a predetermined number of instructions before a task switch of the task.

3. The method of claim 1 wherein the indication of the first and second ordering scope identifiers are received prior to a last instruction of the current ordering scope of the task being executed.

4. The method of claim 1 further comprising:
   asserting a speculative bit for the task in a task table of the processor core prior to the first and second ordering scope identifiers being received by the hardware module circuitry, wherein a task switch will occur for a task switch instruction in response to the task having an asserted speculative bit.

5. The method of claim 4 further comprising:
   receiving, at the processor core, the no task switch indicator; and
   negating the speculative bit for the task in the task table of the processor core in response to receiving the no task switch indicator, wherein a task switch will not occur for the task switch instruction in response to the task having a negated speculative bit.

6. The method of claim 1 further comprising prior to receiving the indication of the first ordering scope identifier:
   receiving a data packet;
   determining a program to process information of the data packet;
   assigning the data packet and the program to the task; and
   assigning the task to the processor core.

7. The method of claim 6 further comprising prior to receiving the indication of the first ordering scope identifier:
   storing a task identifier of the task in a task table of the processor core;
   marking the task as inhibited in the task table, wherein the task is not executed when the task is marked as inhibited;
   asserting a speculative bit for the task in the task table to indicate that the task switch is to be performed when transitioning the processor core from executing in the current ordering scope to executing in the next-in-order ordering scope; and
   marking the task as enabled at the task table in response to a signal from the hardware module circuitry.

8. A data processing system comprising:
   a processor core, the processor core configured to execute instructions, and to send an indication of a first ordering scope identifier for a current ordering scope of a task currently being executed by the processor core and a second ordering scope identifier for a next-in-order ordering scope of the task;
   an ordering scope manager hardware module circuitry configured to communicate with the processor core, the ordering scope manager hardware module circuitry configured to receive the indication of the first and second ordering scope identifiers from the processor core, and, the ordering scope manager is configured to provide a no task switch indicator to the processor core in response to determining that the task is a first-in-transition-order task for the first ordering scope identifier and that the task is next in line, relative to other tasks, to execute in the second ordering scope, wherein an ordering scope table of the ordering scope manager hardware module circuitry includes entries identifying ordering scopes currently being executed by the processor core and by other processor cores in the data processing system; and
   in response to the no task switch indicator being provided, the processor core is configured to transition from executing in the current ordering scope to executing in the next-in-order ordering scope without performing task switch.

9. The data processing system of claim 8 wherein the processor core is configured to send the indication of the first and second ordering scope identifiers a predetermined number of instructions before a task switch of the task.

10. The data processing system of claim 8, wherein the processor core is further configured to assert a speculative bit for the task in a task table of the processor core prior to the indication of the first and second ordering scope identifiers of the task being received by the hardware module circuitry, wherein an asserted speculative bit indicates that a task switch is to be performed in response to being requested.

11. The data processing system of claim 10 wherein the processor core receives the no task switch indicator, and is configured to negate the speculative bit for the task in the task table in response to receiving the no task switch indicator, wherein a task switch will not occur for a task switch instruction in response to the task having a negated speculative bit.

12. The data processing system of claim 8, further comprising:
a work scheduler circuitry configured to communicate with the ordering scope manager hardware module circuitry, the work scheduler circuitry is configured to receive a data packet, is configured to assign the data packet to the task, and is configured to assign the task to the processor core.

13. The data processing system of claim 12, wherein the processor core is configured to store information for the task in a task table of the processor core, is configured to mark the task as inhibited in the task table, is configured to assert a speculative bit for the task in the task table, wherein a task switch will occur for a task switch instruction when the processor core transitions from executing in the current ordering scope to executing in the next-in-order ordering scope in response to the task having an asserted speculative bit, and is configured to mark the task as enabled at the task table in response to a signal from the hardware module circuitry.

14. A data processing system comprising:
a work scheduler circuitry, the work scheduler circuitry configured to assign a task to data of data packet;
a processor core configured to communicate with the work scheduler, the processor core configured to execute instructions, and configured to send an indication of a first ordering scope identifier for a current ordering scope of the task, in response to the task being currently executed by the processor core, and configured to provide an indication of a second ordering scope identifier for a next-in-order ordering scope of the task;
an ordering scope manager hardware module circuitry configured to communicate with the processor core, the ordering scope manager configured to receive the indications of the first and second ordering scope identifiers from processor core, and, in response to determining that the task is a first-in-transition-order task for the first ordering scope identifier and that the processor core is authorized to execute the next-in-order ordering scope, the ordering scope manager hardware configured to provide a no task switch indicator to the processor core, wherein the ordering scope manager hardware module circuitry includes an ordering scope table including entries identifying ordering scopes currently being executed by the processor core and by other processor cores in the data processing system; and
in response to the no task switch indicator being provided, the processor core configured to transition from executing in the current ordering scope to executing in the next-in-order ordering scope without performing task switch.

15. The data processing system of claim 14, wherein the processor core is configured to send the indications of the first and second ordering scope identifiers a predetermined number of instructions before a task switch instruction of the task.

16. The data processing system of claim 14, wherein processor core is configured to assert a speculative bit for the task in a task table of the processor core prior to the indications of the first and second ordering scope identifiers being received by the hardware module circuitry, wherein a task switch will occur for a task switch instruction in response to the task having an asserted speculative bit.

17. The data processing system of claim 16, wherein the processor core is configured to negate the speculative bit for the task in the task table in response to receiving the no task switch indicator, wherein a task switch will not occur for the task switch a negated speculative bit indicates that a task switch is not to be performed.

18. The data processing system of claim 14, wherein the processor core is configured to store the task in a task table of the processor core, configured to mark the task as inhibited in the task table, configured to assert a speculative bit for the task in the task table, wherein a task switch will occur when the processor core transitions from executing in the current ordering scope to executing in the next-in-order ordering scope in response to the task having an asserted speculative bit, and is configured to mark the task as enabled in response to a signal from the ordering scope manager hardware module circuitry.

19. The data processing system of claim 14, wherein tat the task is the first-in-transition-order task for the first ordering scope identifier in response to the task executing in the first ordering scope identifier before any other task executes in the first ordering scope identifier.

20. The method of claim 1, wherein determining that the task is the first-in-transition-order task for the first ordering scope identifier comprises:
determining that the task will execute in the first ordering scope identifier before any other task executes in the first ordering scope identifier.

* * * * *